US009882676B2

(12) United States Patent
Rost

(10) Patent No.: US 9,882,676 B2
(45) Date of Patent: Jan. 30, 2018

(54) LINK-ADAPTATION IN PARTLY CENTRALIZED RADIO ACCESS NETWORKS

(71) Applicant: NEC Europe Ltd., Heidelberg (DE)

(72) Inventor: Peter Rost, Heidelberg (DE)

(73) Assignee: NEC Corporation, Tokyo (JP)

( * ) Notice: Subject to any disclaimer, the term of this patent is extended or adjusted under 35 U.S.C. 154(b) by 290 days.

(21) Appl. No.: 14/200,125

(22) Filed: Mar. 7, 2014

(65) Prior Publication Data

US 2015/0257030 A1 Sep. 10, 2015

(51) Int. Cl.
H04W 28/02 (2009.01)
H04L 1/00 (2006.01)
H04W 52/38 (2009.01)
H04W 24/00 (2009.01)
H04L 12/801 (2013.01)
(Continued)

(52) U.S. Cl.
CPC .......... *H04L 1/0009* (2013.01); *H04L 1/0003* (2013.01); *H04L 47/12* (2013.01); *H04L 47/14* (2013.01); *H04W 24/00* (2013.01); *H04W 28/0247* (2013.01); *H04W 52/146* (2013.01); *H04W 52/267* (2013.01); *H04W 52/343* (2013.01); *H04W 52/386* (2013.01); *H04W 28/0236* (2013.01); *H04W 28/0273* (2013.01);
(Continued)

(58) Field of Classification Search
CPC ........... H04W 28/0215; H04W 52/386; H04W 28/0273; H04W 28/02; H04W 52/38; H04W 28/0284; H04W 28/10; H04W 28/0205; H04W 28/0289; H04W 28/0236; H04W 36/22; H04W 72/0433; H04W 24/00; H04W 88/08; H04W 88/12; H04L 47/22; H04L 1/0009; H04L 47/14; H04L 12/815; H04L 12/801; H04L 1/00; H04L 47/12
USPC .......................................... 370/229, 329–332
See application file for complete search history.

(56) References Cited

U.S. PATENT DOCUMENTS 7,496,109 B1 * 2/2009 Gupta ..................... H04L 47/22
370/413
2005/0128935 A1 * 6/2005 Tang ..................... H04L 1/0003
370/208
(Continued)

OTHER PUBLICATIONS

3GPP, LTE, Evolved Universal Terrestrial Radio Access (E-UTRA), Long Term Evolution (LTE) physical layer, General description (3GPP TS 36.201 version 9.1.0 Release 9), Apr. 2010, pp. 1-14.
(Continued)

*Primary Examiner* — Jae Y Lee
*Assistant Examiner* — Jean F Voltaire
(74) *Attorney, Agent, or Firm* — Leydig, Voit & Mayer, Ltd.

(57) ABSTRACT

A method and system provides for adapting a computational load in a partly centralized radio access network. A computational load of computational elements of a central processor is measured or estimated, which central processor communicates with a plurality of radio access points and user equipment in the partly centralized radio access network. It is determined, by the central processor, whether the computational load should be reduced or increased. The computational load is adjusted by changing at least one of a modulation and coding scheme of the user equipment or an uplink power.

21 Claims, 5 Drawing Sheets

(51) Int. Cl.
    *H04W 52/34*     (2009.01)
    *H04W 52/14*     (2009.01)
    *H04W 52/26*     (2009.01)
    *H04W 36/22*     (2009.01)
    *H04W 88/08*     (2009.01)
    *H04W 28/10*     (2009.01)

(52) U.S. Cl.
    CPC ............ *H04W 28/10* (2013.01); *H04W 36/22* (2013.01); *H04W 88/08* (2013.01)

(56) References Cited

U.S. PATENT DOCUMENTS

| | | | | |
|---|---|---|---|---|
| 2006/0159016 A1* | 7/2006 | Sagfors | ................... | H04L 47/12 370/230 |
| 2008/0259796 A1* | 10/2008 | Abousleman | ........... | H04L 47/10 370/233 |
| 2008/0285494 A1* | 11/2008 | Shin | .................. | H04W 52/0229 370/311 |
| 2013/0203398 A1* | 8/2013 | Callard | ................. | H04W 88/08 455/418 |
| 2015/0085767 A1* | 3/2015 | Einhaus | ................ | H04L 1/0001 370/329 |
| 2015/0244430 A1* | 8/2015 | Shattil | .................. | H04B 1/0003 370/254 |
| 2015/0270877 A1* | 9/2015 | Hessler | .................. | H04B 7/024 370/329 |

OTHER PUBLICATIONS

3GPP, LTE, Evolved Universal Terrestrial Radio Access (E-UTRA) and Evolved Universal Terrestrial Radio Access Network (E-UTRAN), Overall description, Stage 2 (3GPP TS 36.300 version 11.8.0 Release 11), Jan. 2014, pp. 1-218.

Rost, et al., "C-RAN the Road Towards Green RAN", White Paper v2.5, Oct. 2011, pp. 1-44.

* cited by examiner

LINK-ADAPTATION IN PARTLY CENTRALIZED RADIO ACCESS NETWORKS

The work leading to this invention has received funding from the European Union's Seventh Framework Programme (FP7/2007-2013) under grant agreement n° 317941.

FIELD

The present invention relates to a method and system for adapting a computational load in a partly centralized radio access network (RAN).

BACKGROUND

Long Term Evolution (LTE) is the latest standard in mobile network technology which is being developed by the $3^{rd}$ Generation Partnership Project (3GPP). An LTE network architecture consists of an Evolved Universal Terrestrial Radio Access Network (E-UTRAN) and an Evolved Packet Core (EPC). In the E-UTRAN, an evolved NodeB (eNB), as a local radio access point (RAP) or base station (BS), performs all RAN-related functionality. Thus, processing is mostly decentralized at the individual locations of the eNBs.

FIG. 1 illustrates an exemplary LTE network architecture and FIG. 2 illustrates the functions of the E-UTRAN and EPC therein. The eNBs, the only entity of the E-UTRAN, perform all of the RAN functionality including the protocols of layers 1-3 shown in FIG. 3 at their individual decentralized locations. The lowest layer of the protocol stacks, the physical layer (PHY), defines the means of transmission. The Medium Access Control (MAC) sublayer communicates with the physical layers by the transport channels and performs scheduling and multiplexing/demultiplexing functions for transmission between the transport channels and the logical channels which connect to the Radio Link Control (RLC) layer. The RLC protocol is responsible for ordering and adapting the size of data packets being transmitted. Between the layer 2 RLC and the layer 3 Radio Resource Control (RRC) protocol is the Packet Data Convergence Protocol (PDCP), which processes information on the control side with the RRC and in the packets from the user side. To carry out the protocol stack, each eNB is adapted to perform a number of measurement and control functions.

The eNBs communicate with each other via the X2 interface to reduce packet losses which can occur when a mobile user moves from a cell covered by one eNB to a cell covered by another eNB. Accordingly, each eNB is responsible for handling interference between the cells using Radio Resource Management (RRM) functionality. Other functions required of the eNBs include Resource Block (RB) control, connection mobility control, radio admission control and dynamic resource allocation.

The eNBs communicate with the Evolved Packet Core (EPC) via the S1 interface. The EPC includes a Mobility Management Entity (MME), a Serving Gateway (S-GW) and a Packet Data Network Gateway (P-GW). The MME is responsible for authenticating the users, controlling existing sessions therewith and managing incoming sessions. The S-GW serves as a mobility anchor. There is one S-GW for each user device in use at a given time. The P-GW is responsible for IP address allocation for users in the E-UTRAN and filtering of the data packets.

SUMMARY

In an embodiment, the present invention provides a method and system for adapting a computational load in a partly centralized radio access network. A computational load of computational elements of a central processor is measured or estimated, which central processor communicates with a plurality of radio access points and user equipment in the partly centralized radio access network. It is determined, by the central processor, whether the computational load should be reduced or increased. The computational load is adjusted by changing at least one of a modulation and coding scheme of the user equipment or an uplink power.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

It is expected that future networking will need to accommodate an ever-increasing demand of mobile services, delivered not only to mobile devices of users, such as smartphones, but also to automated, special-purpose devices (for example, ones having a Universally Integrated Circuit Card (UICC) or implementing machine to machine (M2M) technology) such as cars, appliances, etc. All of these devices demanding mobile services are collectively referred to herein as user equipment (UE). Therefore, it is proposed that future RANs will be more centralized than modern RANs in order to provide flexibility and scalability, as well as to enable a diverse range of possible services to meet a wider variety of needs. It is further proposed that this flexibility will be provided by exploiting cloud technology using Network Functions Virtualization (NFV) and Software Defined Networking (SDN). In particular, this allows for the use of Radio Access Network as a Service (RANaaS), which flexibly implements at least a part of the RAN functionality, these functions being defined by software existing centrally in the cloud-computing platform and delivered on-demand as a service.

Figure 1:
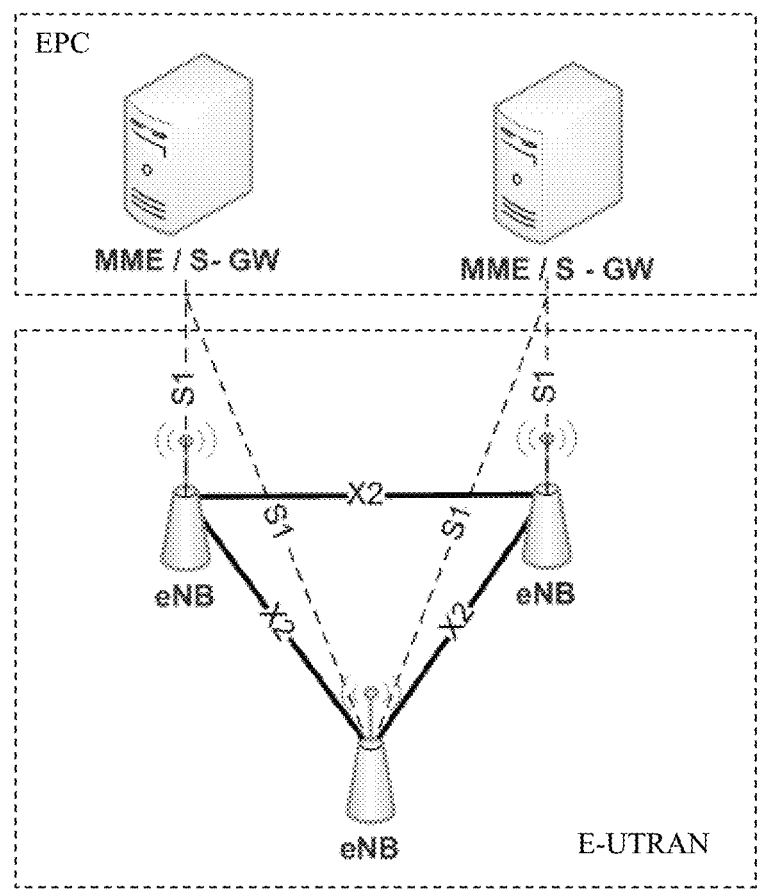
FIG. 1 schematically shows an exemplary LTE network infrastructure.
Figure 2:
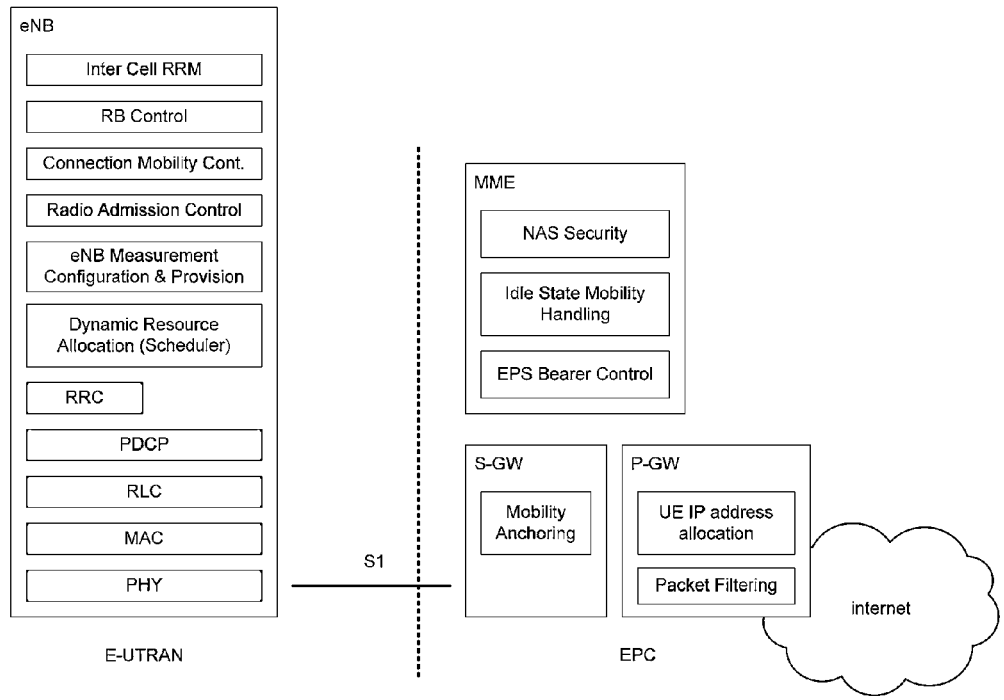
FIG. 2 schematically shows functional differences between the E-UTRAN and the EPC in the exemplary LTE network infrastructure of FIG. 1.
Figure 3:
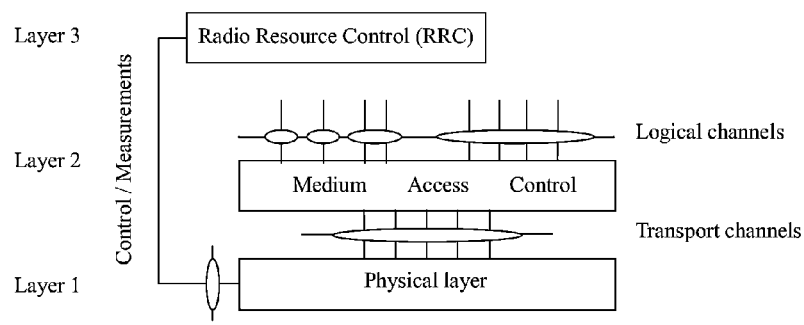
FIG. 3 schematically shows the protocol stack implemented in the exemplary LTE network infrastructure of FIG. 1.
Figure 4:
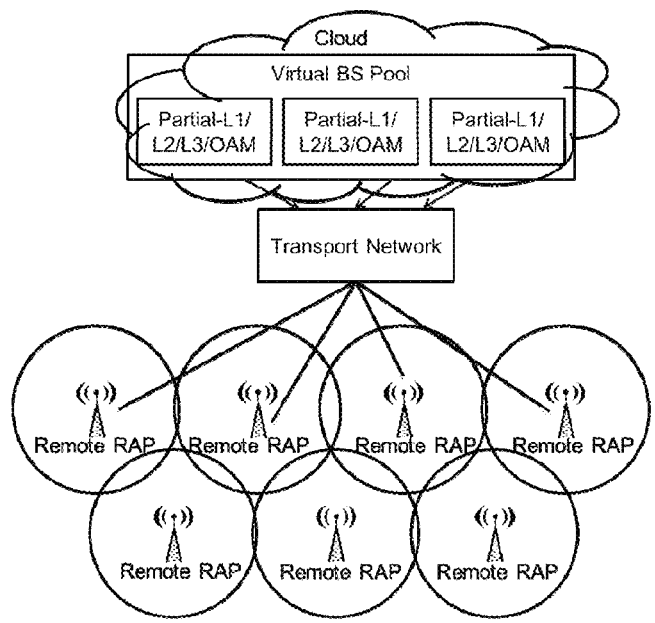
FIG. 4 schematically shows an example of uplink processing in a partly centralized architecture.
Figure 5:
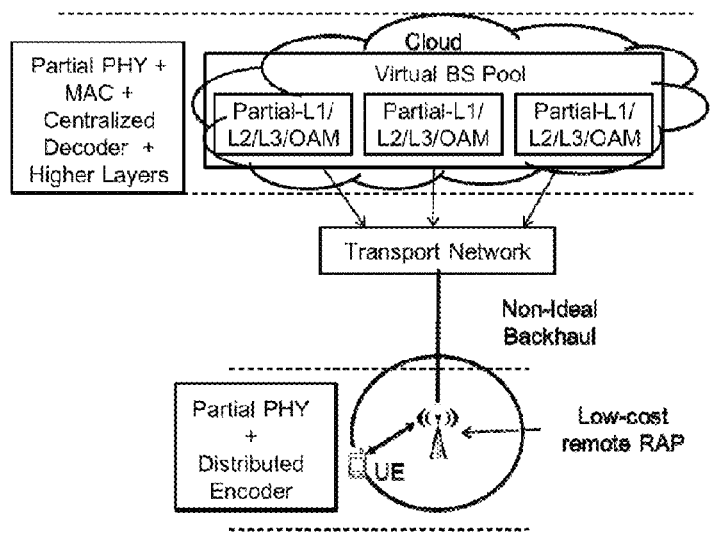
FIG. 5 schematically shows an example of downlink processing in a partly centralized architecture.

This implies that a remote RAP, or eNB, will only perform part of layers 1-3 of the RAN functionality, while the remaining functionality will be performed at a central processor. This central processor may be a virtual BS pool executed on top of the cloud-computing platform, as illustrated in FIGS. 4 and 5, showing uplink and downlink processing in such a partly centralized infrastructure, respectively. For example, as seen from a comparison to FIG. 2, the virtual BS pool performs a part of the functions which were previously performed by the RAPs, or eNBs, during uplink and downlink processing. This advantageously allows for the implementation of lower cost RAPs, which is especially advantageous when considering that additional flexibility can be provided by ultra-dense deployments of RAPs. The central processor, e.g. the virtual BS pool in the cloud-computing platform, will provide computational resources on-demand and virtualized.

Depending on the RAN functionality that is centralized, the central processor will need to handle different degrees of computational load. Due to varying channel conditions and user mobility, there is a significant computational diversity available. Additionally, the degree to which the RAN functionality is centralized can also be adjusted on a case-by-case basis, thereby allowing for increased control over the computational load at the central processor.

The computational resources at the central processor are limited and, at least physically, are not infinitely available. Due the varying computational load, the ratio of peak-required computational load to average required computational load (Peak-to-Average-Computational-Effort-Ratio (PACER)) can be very high. If PACER is very high, this means that the central processor is equipped with a large number of computational elements (processor, processor cores, servers, etc.) in order to satisfy the peak requirement. However, for most of the time, only a small portion of these computational resources are required, thereby resulting, overall, in high energy costs and capital expenditures. Nevertheless, because the central processor must serve all UEs in a network given the available wireless access resources, it is possible that all of the computational resources may not be sufficient at a given time. In this case, where the computational resources do not suffice for serving all UEs, it is possible that the RAN operation itself fails or packet drops occur, which lead to a significantly reduced overall performance (possibly violating Quality of Service (QoS) requirements).

Based on channel state information at the transmitter, a given RAP will select a Modulation and Coding Scheme (MCS) in order to either maximize a metric, such as throughput, or minimize a metric, such as outage probability, or latency. Alternatively or additionally, the selection of the MCS can be performed centrally. The MCS describes the modulation order and code rate of the transmission to the central processor.

According to an embodiment of the present invention, a method and system is provided for monitoring the available and currently-used computational resources at the central processor. The MCS is adjusted on a per-UE basis (the MCS assigned to individual UEs being hereinafter referred to as UE-MCS combinations) in order to allow for adaptation of the computational load at the central processor. The number of required computational resources to successfully decode a received data packet, at the central processor, increases with the MCS and its decreasing Signal-to-Noise Ratio (SNR) distance to the maximum rate.

For example, the system could include a turbo-decoder at the receiver. With an increasing number of iterations by the turbo-decoder, the minimum SNR which satisfies a specific block error rate decreases. However, this increased number of iterations requires more computational resources. In this case, an embodiment of the present invention provides for decreasing the required computational load by choosing a lower MCS for a specific SNR in order to reduce the number of required iterations.

The method and system according to embodiments of the present application can include any or all of the following features in various combinations:
 monitoring of the current computational load of the central processor, the currently occupied spectral resources, MCS, and/or required computational load for each UE-MCS combination;
 estimating computational load based on lookup tables or based on estimates from previous frames;
 changing the MCS scheme or altering the uplink power configuration based on current computational load and per-UE-MCS combination required computational load; and
 optimizing computational load based on a metric such as maximum sum-throughput, maximum min-throughput, proportional fairness and/or latency, while maintaining the constraint of maximum sum-computational load.

The MCS scheme can be changed or adapted by assigning higher or lower MCS to the individual UE-MCS combinations. For example, if the UE can be supported by the current channel conditions and available computational resources, a higher MCS can be provided for the UE-MCS combination and/or a lower uplink power can be assigned to the UE. On the other hand, if there are insufficient available computational resources to support the UE, then a lower MCS can be provided for the UE-MCS combination and/or a higher uplink power can be assigned to the UE.

In another embodiment, more complex processing, such as Inter-Cell Interference Coordination or Joint Signal Processing algorithms, is provided for as needed by reducing the computational load of other UE-MCS pairs without harming their throughput significantly.

Figure 6:
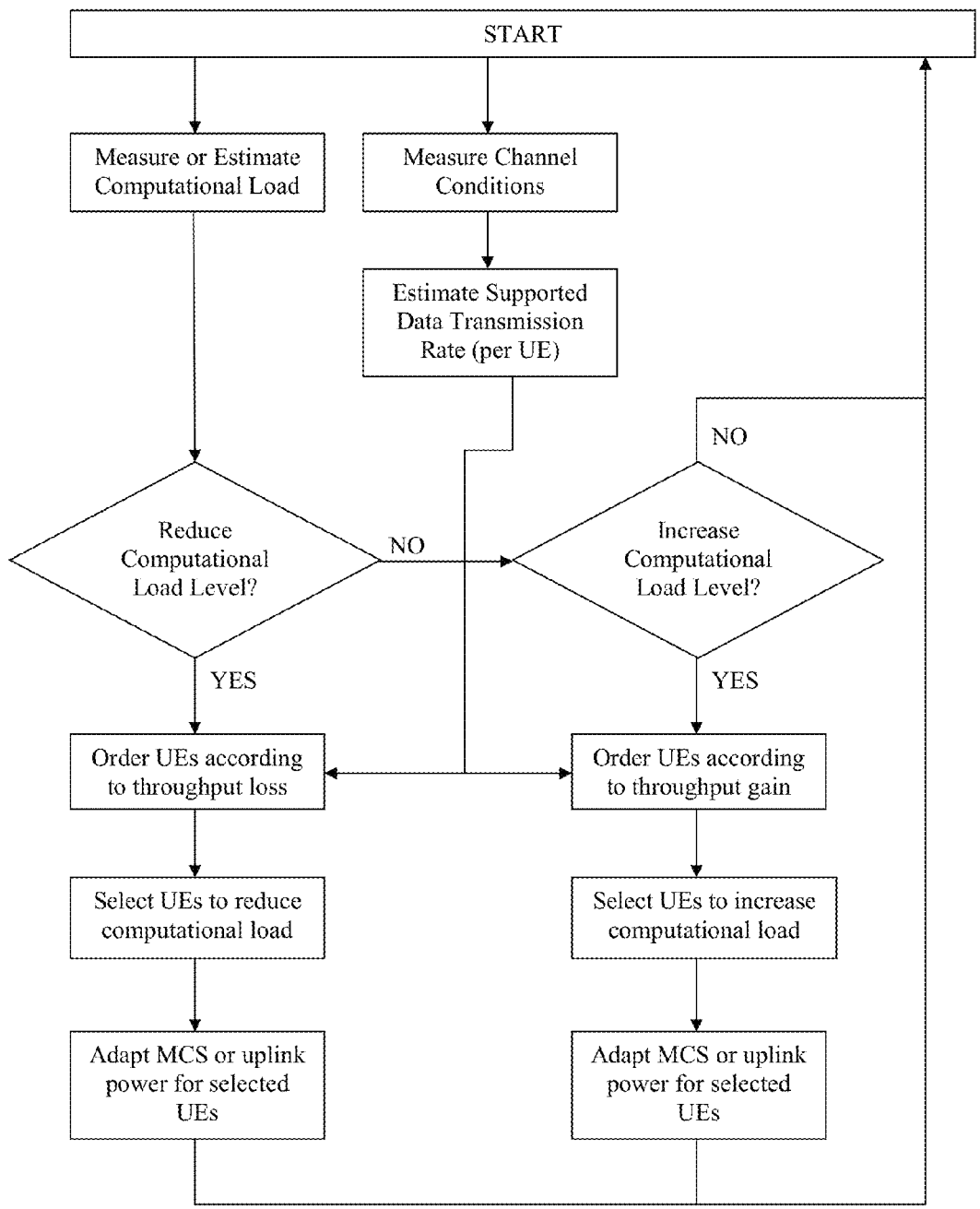
FIG. 6 schematically shows a possible functional flow of a processor adapted to implement a link-adaptation according to an embodiment of the invention.
Figure 7:
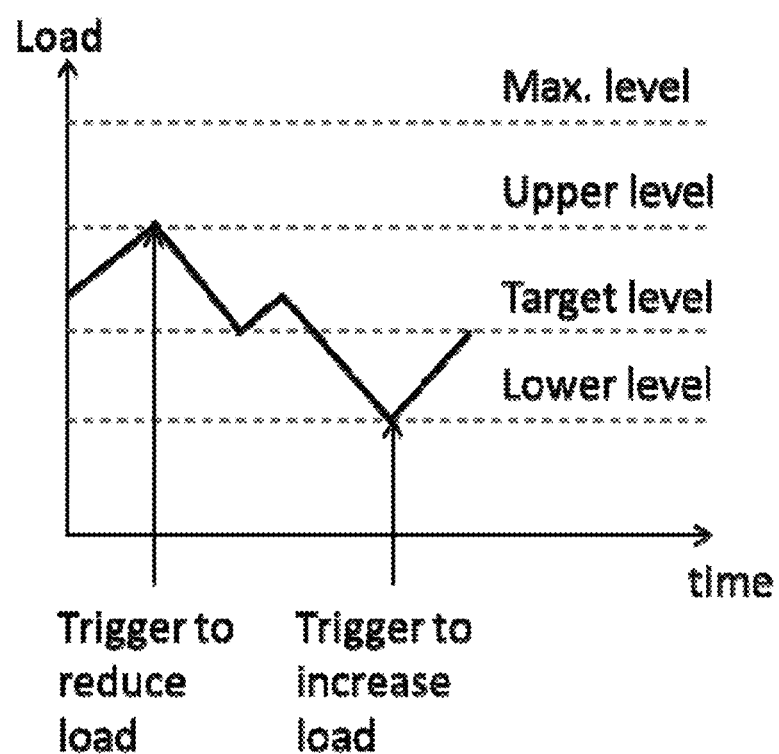
FIG. 7 shows an exemplary chart of the computational load over time and triggers used for the link-adaptation according to an embodiment of the invention.

Referring to FIG. 6, an exemplary process flow chart to be carried out by a system according to an embodiment of the invention is shown. The individual steps are carried out by computational elements of a central processor (which can, of course, include a plurality of processors) configured by software (which can, of course, have been provided on-demand as part of the SDN), or dedicated circuitry or logic, to perform the functions indicated. Moreover, the process preferably runs continuously or in iterations repeated as necessary to maintain the computational load near a target level (see FIG. 7).

At step 10, the system measures the computational load present at the central processor. For example, a measurement module is used to track the performance and/or utilization of the computational elements of the central processor and/or to estimate the computational load by reference to look-up tables and/or previous data frames (e.g., providing parameters of the computational load over time). At step 12, which can be performed before or after, but preferably concurrently with step 10, the same or a different measurement module of the central processor performs a channel measurement to determine the current channel conditions, or preferably continuously tracks the channel conditions. For example, based on an amount of data traveling through the channels for UEs being served at a given point in time and/or a capacity of the channels to accept further throughput or increased transmission rates, an estimate of the MCS which can be supported for each individual UE (i.e., each UE-MCS combination) is made by the central processor in step 14. At steps 16 and 18, it is determined whether the computational load should be reduced or increased. For example, if the computational load is at or past a lower level, then the computational load should be increased or, on the other hand, if the computational load is at or past an upper level, then the computational load should be decreased (see FIG. 7). As another example, the central processer predicts the computational load, for example, based on recent or expected changes to the computational load or an amount of UEs being served, and determines whether to increase or decrease the load based on this prediction.

If it is determined that the computational load should be reduced, all or a portion of the UEs are ordered according to their throughput loss in step 22, for example, in increasing order. Alternatively or additionally, all or a portion of the UEs can be organized by other or additional metrics, such as latency. Then, at step 24, at least a part of the UEs are selected as necessary to achieve the desired reduction in computational load. This part of the UEs are then assigned a new or adapted MCS scheme by the central processor at step 26. The decrease in MCS, or increase in uplink power, is preferably made on a per-UE basis.

On the other hand, if it is determined that the computational load should be increased, all or a portion of the UEs are ordered according to their throughput gain in step 28, for example, in decreasing order. Alternatively or additionally, all or a portion of the UEs can be organized by other or additional metrics, such as latency. Then, at step 30, at least a part of the UEs is selected as necessary to achieve the desired increase in computational load. This part of the UEs is then assigned a new or adapted MCS scheme by the central processor at step 32. The increase in MCS, or decrease in uplink power, is preferably made on a per-UE basis.

In an embodiment, the system can utilize a greedy approach for determining which UEs should have a decreased or increased MCS. For example, if the computational load should be reduced, the user(s) consuming the highest computational load (or other metric) is selected for having its MCS decreased or its uplink power increased. As another example, if the computational load should be increased, the user(s) having the highest increase in throughput (or other metric, such as those with the most latency) is selected for having its MCS increased or its uplink power decreased. Another approach would be to use proportional fairness.

An algorithm running on the central processor is used to determine how the new or adapted MCS schemes will change the computational load, or vice versa, for example, using look-up tables or functions derived from real or estimated relationships between MCS and computational load changes. The algorithm therefore correlates the computational load to the MCS schemes, or the uplink power, as opposed to systems where the computational load can be seen to correlate to the currently-achieved throughout depending on the SNR. The algorithm preferably takes into account QoS metrics such that neither latency nor throughput requirements are violated for any UE-MCS combination. Advantageously, if the algorithm determines that computational power is the limiting factor to satisfy data rate demand and not the available wireless resources, then the MCS can be reduced without throughput loss.

Accordingly, it can be seen that an embodiment of the present invention balances temporal and spatial computational load changes through active shaping of the actual computational load. This advantageously results in a reduced PACER and therefore cost-efficient deployment of centralized RAN hardware. Moreover, practical deployments of the central processor will avoid a computational overload which is a possible event, e.g., if an unlikely and possible high system-throughput occurs due to very good channel conditions of UEs as well as very high data-rate demand.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for adapting a computational load in a partly centralized radio access network, the method comprising:
    determining, by measuring or estimating, a computational load, on computational elements of a central processor located at a core network, required to perform decoding of received data packets, wherein the central processor is connected, via a transport network, to a plurality of remote radio access points and is configured to communicate with a plurality of user equipment;
    determining, by the central processor, whether the computational load required to perform decoding of received data packets should be reduced or increased; and
    adjusting the computational load required to perform decoding of received data packets by at least one of changing a modulation and coding scheme (MCS) of at least one of the user equipment or assigning an increased or decreased uplink power to at least one of the user equipment.

2. The method according to claim 1, wherein the determining whether the computational load required to perform decoding of received data packets should be reduced or increased is performed by comparing the determined computational load required to perform decoding of received data packets with a predetermined target level, and
    wherein it is determined that the computational load required to perform decoding of received data packets should be reduced where the determined computational load required to perform decoding of received data packets is above the target level and increased where the determined computational load required to perform decoding of received data packets is below the target level.

3. The method according to claim 1, wherein the determining whether the computational load required to perform decoding of received data packets should be reduced or increased is performed by comparing the determined computational load required to perform decoding of received data packets to a predetermined upper level and lower level,
wherein it is determined that the computational load required to perform decoding of received data packets should be reduced where the determined computational load required to perform decoding of received data packets is at or past the upper level and increased where the determined computational load required to perform decoding of received data packets is at or past the lower level.

4. The method according to claim 1, further comprising:
monitoring channel conditions in the partly centralized radio access network; and
determining a rate of transmission for each of the plurality of user equipment based on the channel conditions.

5. The method according to claim 4, wherein the computational load required to perform decoding of received data packets is continuously tracked by the central processor, and
wherein the channel conditions are monitored by the central processor.

6. The method according to claim 1, further comprising organizing the plurality of user equipment based on a metric.

7. The method according to claim 6, wherein the metric is throughput loss or gain.

8. The method according to claim 6, further comprising selecting at least a part of the plurality of organized user equipment to be used for the adjusting of the computational load required to perform decoding of received data packets,
wherein the adjusting the computational load required to perform decoding of received data packets includes adapting the modulation and coding scheme of each one of the selected plurality of user equipment on a per-user equipment basis.

9. The method according to claim 8, wherein the selecting is performed based on a greedy approach or a proportional fairness approach.

10. The method according to claim 1, wherein the adjusting is performed so as to optimize maximum sum-throughput, maximum min-throughput or latency using a maximum sum-computational load as a constraint.

11. The method according to claim 1, wherein the computational load required to perform decoding of received data packets is determined by estimating the computational load required to perform decoding of received data packets using at least one of look-up tables, prior measurements and prior estimates.

12. A system for adapting a computational load, on a central processor in a partly centralized radio access network, required to perform decoding of received data packets, the system comprising:
the central processor including one or more computational elements, the central processor being located at a core network and being connected, via a transport network, to a plurality of remote radio access points, the central processor being configured to:
communicate with a plurality of remote radio access points and user equipment in the partly centralized radio access network,
determine, by measuring or estimating, the computational load, on the central processor, required to perform decoding of received data packets,
determine whether the computational load required to perform decoding of received data packets should be reduced or increased, and
adjust the computational load required to perform decoding of received data packets by at least one of changing a modulation and coding scheme (MCS) of at least one of the plurality of user equipment or assigning an increased or decreased uplink power to at least one of the plurality of user equipment.

13. The system according to claim 12, wherein one or more of the computational elements of the central processor is configured to compare the determined computational load required to perform decoding of received data packets to at least one predetermined level and increase or decrease the computational load required to perform decoding of received data packets based on the comparison.

14. The system according to claim 12, wherein the central processor is configured to monitor channel conditions in the partly centralized radio access network and determine a rate of transmission for each of the plurality of user equipment based on the channel conditions.

15. The system according to claim 12, wherein the central processor is configured to determine throughput loss or gain of each one of the plurality of user equipment and sort the plurality of user equipment based on the determined throughput loss or gain.

16. The system according to claim 15, wherein the central processor is configured to select at least a part of the plurality of sorted user equipment to be used for the adjustment of the computational load required to perform decoding of received data packets, and
wherein the central processor is configured to adjust the computational load required to perform decoding of received data packets by adapting the modulation and coding scheme (MCS) of each one of the plurality of selected user equipment on a per-user equipment basis.

17. The system according to claim 16, wherein the central processor is configured to perform the selection based on a greedy approach or a proportional fairness approach.

18. The system according to claim 12, wherein the central processor is configured to perform the adjustment of the computational load required to perform decoding of received data packets so as to optimize maximum sum-throughput, maximum min-throughput, or latency using a maximum sum-computational load as a constraint.

19. The system according to claim 12, wherein the central processor is configured to perform the determining the computation load required to perform decoding of received data packets by estimation of the computational load using at least one of look-up tables, prior measurements, and prior estimates.

20. A non-transitory, tangible medium containing processor executable instructions, which when executed by computational elements of a central processor communicating with a plurality of user equipment in a partly centralized radio access network, cause the central processor to perform the following steps:
determining, by measuring or estimating, a computational load, on the computational elements of the central processor, required to perform decoding of received data packets;

determining, by the central processor, whether the computational load required to perform decoding of received data packets should be reduced or increased; and adjusting the computational load required to perform decoding of received data packets by at least one of changing a modulation and coding scheme (MCS) of at least one of the user equipment or assigning an increased or decreased uplink power to at least one of the user equipment, wherein the central processor is located at a core network and is connected, via a transport network, to a plurality of remote radio access points.

21. The method of claim 1, wherein the adjusting the computational load required to perform decoding of received data packets by at least one of changing a modulation and coding scheme (MCS) of at least one of the user equipment or assigning an increased or decreased uplink power to at least one of the user equipment comprises changing an MCS of at least one of the user equipment.

* * * * *